United States Patent
Zhou

(10) Patent No.: US 11,852,862 B2
(45) Date of Patent: Dec. 26, 2023

(54) BACKLIGHT MODULE INCLUDING INTERFERENCE FIT AND LIQUID CRYSTAL DISPLAY DEVICE INCLUDING THE SAME

(71) Applicant: WUHAN CHINA STAR OPTOELECTRONICS TECHNOLOGY CO., LTD., Wuhan (CN)

(72) Inventor: Zheng Zhou, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 399 days.

(21) Appl. No.: 17/260,988

(22) PCT Filed: Nov. 23, 2020

(86) PCT No.: PCT/CN2020/130741
§ 371 (c)(1),
(2) Date: Jan. 15, 2021

(87) PCT Pub. No.: WO2022/077705
PCT Pub. Date: Apr. 21, 2022

(65) Prior Publication Data
US 2022/0350073 A1    Nov. 3, 2022

(30) Foreign Application Priority Data
Oct. 13, 2020  (CN) .......................... 202011090031.2

(51) Int. Cl.
*F21V 8/00* (2006.01)
*G02F 1/1333* (2006.01)

(52) U.S. Cl.
CPC ........... *G02B 6/0088* (2013.01); *G02B 6/005* (2013.01); *G02F 1/13332* (2021.01);
(Continued)

(58) Field of Classification Search
CPC ................ G02B 6/0086; G02B 6/0088; G02F 1/133314; G02F 1/133317; G02F 1/13332; G02F 1/133325
See application file for complete search history.

(56) References Cited

U.S. PATENT DOCUMENTS

2015/0070934 A1   3/2015  Chou
2016/0291231 A1*  10/2016 Jang ..................... G09G 3/2003
(Continued)

FOREIGN PATENT DOCUMENTS

CN   201875645 U   6/2011
CN   102865521 A   1/2013
(Continued)

OTHER PUBLICATIONS

International Search Report in International application No. PCT/CN2020/130741, dated Jul. 12, 2021.
(Continued)

*Primary Examiner* — Keith G. Delahoussaye
(74) *Attorney, Agent, or Firm* — PV IP PC; Wei Te Chung; Zhigang Ma

(57) ABSTRACT

A backlight module and a liquid crystal display device are disclosed. The backlight module includes a backplate, a light bar, a first optical film, a frame, and an adhesive layer. By an arrangement of a corresponding optical film adhesively attached to a side of the frame opposite to the light bar through the adhesive layer, heat changes of the corresponding optical film are concentrated on one side of the light bar, which facilitates fulfillment of reliable attachment of the corresponding optical film and narrow bezel design of
(Continued)

in-vehicle backlight modules, as well as eliminating or mitigating problems of bright edges and a fluorescence phenomenon in the backlight modules.

18 Claims, 3 Drawing Sheets

(52) U.S. Cl.
CPC .. *G02F 1/133314* (2021.01); *G02F 1/133317* (2021.01); *G02F 1/133325* (2021.01)

(56) References Cited

U.S. PATENT DOCUMENTS

| | | | | |
|---|---|---|---|---|
| 2016/0306104 | A1* | 10/2016 | Hsieh | G02B 6/0088 |
| 2017/0192163 | A1* | 7/2017 | Oh | G06F 1/1637 |

FOREIGN PATENT DOCUMENTS

| | | |
|---|---|---|
| CN | 207164418 U | 3/2018 |
| CN | 110174800 A | 8/2019 |
| CN | 212781605 U | 3/2021 |
| JP | 2014224939 A | 12/2014 |

OTHER PUBLICATIONS

Written Opinion of the International Search Authority in International application No. PCT/CN2020/130741, dated Jul. 12, 2021.

* cited by examiner

BACKLIGHT MODULE INCLUDING INTERFERENCE FIT AND LIQUID CRYSTAL DISPLAY DEVICE INCLUDING THE SAME

RELATED APPLICATIONS

This application is a Notional Phase of PCT Patent Application No. PCT/CN2020/130741 having international filing date of Nov. 23, 2020, which claims the benefit of priority of Chinese Patent Application No. 202011090031.2 filed on Oct. 13, 2020. The contents of the above applications are all incorporated by reference as if fully set forth herein in their entirety.

BACKGROUND OF INVENTION

1. Field of Invention

The present invention relates to a technical field of displays, and particularly to, a backlight module and a liquid crystal display device.

2. Related Art

With development of automotive display technologies, appearance requirements of in-vehicle backlight modules are getting higher and higher, showing a trend toward larger screens and narrow bezels. In order to achieve a narrow-bezel design, current in-vehicle backlight modules usually use double-sided tapes attached to steps of light guide plates for fixing corresponding optical films in a lengthwise direction of the backlight modules. The optical films are assembled and fixed based on a side where the optical films are fixed, and a room for expansion and contraction of the optical films is reserved on the other side.

Since reliability requirements of the in-vehicle backlight modules are relatively strict, projection stages are generally provided on light guide plates to fix corresponding optical films. In view of narrow frame limitations of the backlight modules, there is not enough space in a lengthwise direction of the backlight modules to fix the optical films (insufficient space for expansion of the optical films). In addition, providing projection stages of the light guide plates on relatively wide lower sides of frames, that is, on flexible printed circuit (FPC) sides, tend to cause problems, such as bright edges and a fluorescence phenomenon in the backlight modules.

SUMMARY OF INVENTION

An object of the present invention is to provide a backlight module and a liquid crystal display device to overcome problems that bright edges and a fluorescence phenomenon occur in conventional in-vehicle backlight modules.

In a first aspect, the present application provides a backlight module, comprising a backplate comprising a first block wall and a second block wall disposed opposite to the first block wall; a light bar disposed on an inner side of the first block wall; a first optical film having a light incident surface and a light output surface, and the light incident surface facing a support surface disposed on the backplate; and a frame comprising a pressing surface facing the light output surface of the first optical film; wherein the pressing surface of the frame provided adjacent to a side of the second block wall is adhesively attached to the light output surface of the first optical film through an adhesive layer.

Based on the first aspect, in a first embodiment of the present aspect, a protrusion is disposed on the pressing surface and is adhesively attached to the light output surface of the first optical film through the adhesive layer, and the protrusion is structured to cover part of the pressing surface.

Based on the first aspect, in a second embodiment of the present aspect, the protrusion is disposed in a longitudinal direction on the pressing surface and is located at a middle portion of the pressing surface.

Based on the first aspect, in a third embodiment of the present aspect, an interference fit is provided between the adhesive layer and the first optical film.

Based on the third embodiment of the first aspect, in a fourth embodiment of the first aspect, the interference fit is provided with an interference range of 0.08 millimeters (mm) to 0.12 mm.

Based on the first aspect, in a fifth embodiment of the first aspect, the protrusion is rectangular in shape, and has a length between 20 mm and 30 mm, a width between 2 mm and 3 mm, and a height between 0.1 mm and 0.5 mm.

Based on the first aspect, in a sixth embodiment of the first aspect, the adhesive layer has a thickness the same as a distance between the protrusion and the first optical film.

Based on the first aspect, in a seventh embodiment of the first aspect, the backlight module further comprising a second optical film and a light-shielding elastic fixing member; wherein the second optical film has a light incident surface and a light output surface, the light incident surface of the second optical film is disposed away from the light incident surface of the first optical film, and the light output surface of the second optical film is disposed facing the light incident surface of the first optical film; and wherein one end of the light-shielding elastic fixing member is connected to the first block wall, and another end is connected to the light output surface of the second optical film, and the light-shielding elastic fixing member is located between the light incident surface of the first optical film and the light output surface of the second optical film.

Based on the seventh embodiment of the first aspect, in an eighth embodiment of the first aspect, the light-shielding elastic fixing member is a black single-sided tape.

Based on the eighth embodiment of the first aspect, in a ninth embodiment of the first aspect, the single-sided tape has a length between 20 mm and 30 mm and a width between 5 mm and 10 mm.

Based on any one of the embodiments of the first aspect, in a tenth embodiment of the first aspect, the second block wall overlaps part of the first optical film.

Based on the tenth embodiment of the first aspect, in an eleventh embodiment of the first aspect, a distance between the first optical film and the first block wall is greater than a distance between the second optical film and the first block wall.

Based on the eleventh embodiment of the first aspect, in a twelfth embodiment of the first aspect, a distance between the first optical film and the second block wall is equal to a distance between the second optical film and the second block wall.

Based on the twelfth embodiment of the first aspect, in a thirteenth embodiment of the first aspect, the adhesive layer is a double-sided tape.

In a second aspect, the present application provides a liquid crystal display device, comprising the backlight module of any one of the embodiments in the first aspect and a liquid crystal display screen disposed on a rear surface of the pressing surface.

Based on the second aspect, in a first embodiment of the second aspect, the liquid crystal display device further comprises a flexible circuit board assembled with the liquid crystal display screen.

A backlight module and a liquid crystal display device provided by the present application have advantageous effects as follows: by an arrangement of a corresponding optical film adhesively attached to a side of a frame opposite to a light bar through an adhesive layer, heat changes of the corresponding optical film are concentrated on one side of the light bar, thereby facilitating reliable attachment of the corresponding optical film and an in-vehicle backlight module of a narrow bezel design, as well as eliminating or mitigating problems of bright edges and a fluorescence phenomenon in the backlight modules.

DESCRIPTION OF PREFERRED EMBODIMENTS

In order to make the purpose, technical solutions, and effects of this application clearer, the following further describes this application in detail with reference to the drawings and embodiments. It should be understood that the specific embodiments described here are only used to explain the application, and not used to limit the application.

Figure 1:
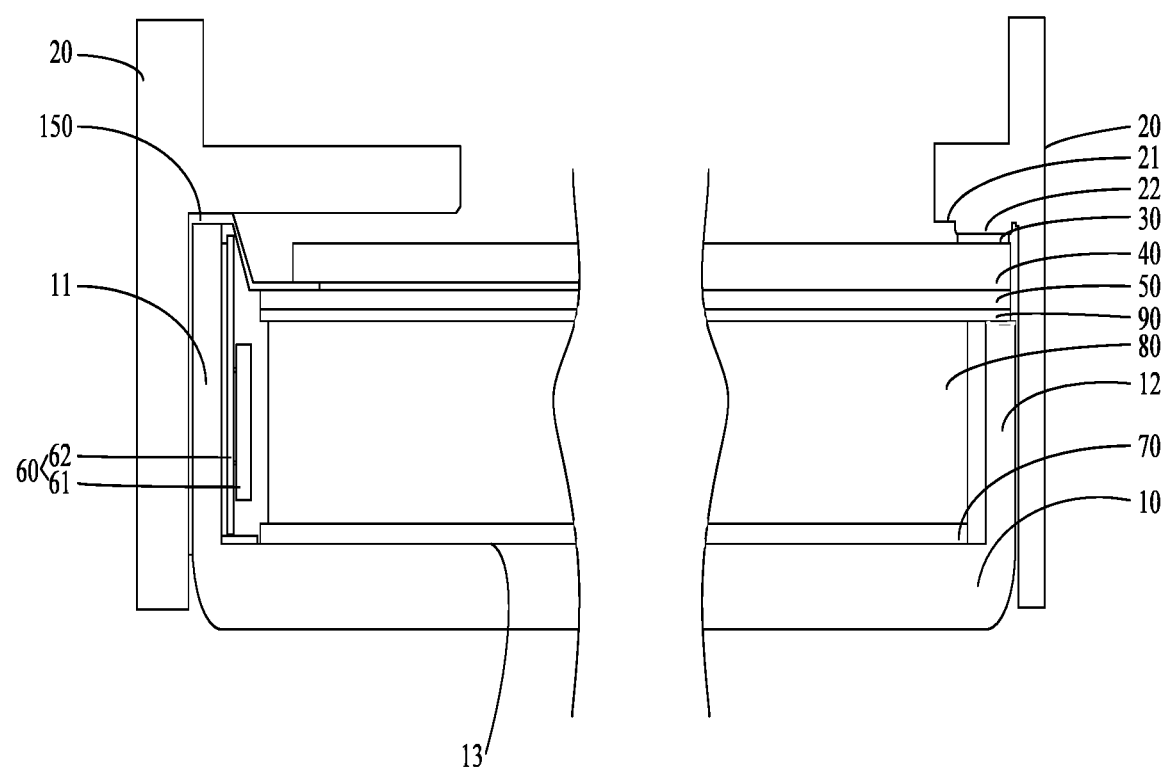
FIG. 1 is a schematic structural view of a backlight module provided by an embodiment of the present application.

Please refer to FIGS. 1 to 4. FIG. 1 shows a schematic structural view of a backlight module provided by an embodiment of the present application. The backlight module includes a backplate 10, a light bar 60, a first optical film 40, a frame 20, and an adhesive layer 30. Specifically, a bottom of the backplate 10 has a support surface 13 disposed toward a direction where light is output. The backlight 10 includes at least a first block wall and a second block wall 12 located at side edges of the backlight 10. The first block wall 11 and the second block wall 12 are disposed opposite to each other. Both the first block wall 11 and the second block wall 12 may be, but not limited to, long sides of the backplate 10, or may be short sides of the backplate 10. The backplate 10 may be made of, but not limited to, integral sheet metal casting, and may also be made of other materials or manufactured by other processes. Specifically, the first block wall 11 and the second block wall 12 have heights different from each other, and the height of the first block wall 11 is greater than the height of the second block wall 12. The light bar 60 is fixedly attached an inner side of the first block wall 11. The first optical film 40 has a light incident surface the facing the support surface 13, and the first optical film 40 is not provided in a stack arrangement with the light bar 60. The first optical film 40 may, but not limited to, overlap part of the second block wall 12 and is supported by the second block wall 12. The frame 20 has a pressing surface 21 facing a light output surface of the first optical film 40 and is adhesively attached to the light output surface of the first optical film 40 through the adhesive layer 30. Part of the adhesive layer 30 located adjacent to a side of the second block wall 12 is fixedly attached to the first optical film 40. During thermal expansion and contraction, the first optical film 40 generally expands or contracts in a direction toward the first block wall 11, enabling a corresponding optical film to expand in the same direction, so that there is no need to provide a room for expansion on a side of the second block wall 12. Alternatively, a small room for expansion may be provided for facilitating fulfillment of reliable attachment of corresponding optical films and narrow bezel design of in-vehicle backlight modules, as well as eliminating or mitigating problems of bright edges and a fluorescence phenomenon in the backlight modules caused by a certain reflection effect resulting from light emitted by the light bar 60 due to an arrangement of the adhesive layer 30 being too close to the light bar 60.

It should be noted that the light output surface and the light incident surface in this embodiment refer to a front surface or a rear surface of a corresponding optical film, wherein the light output surface is a plane facing a side of a liquid crystal display screen 100, on the contrary, the light incident surface is a plane facing the support surface 13 of the backplate 10. Based on economic and practical concerns, the adhesive layer 30 may be, but not limited to, a double-sided tape, or other connectors to achieve connection between the pressing surface 21/the protrusion 22 and the first optical film 40.

It is understandable that when the backlight module is working, it can generate a lot of heat, and thus a room is needed for heat expansion of an optical film corresponding to the backlight module in a situation of being affected by heat. If there is no room for heat expansion, the corresponding optical film will bulge upward at certain positions, adversely affecting performance on backlight output to the liquid crystal display screen 100, further adversely affecting display effects. In addition, since the backlight module is used in an in-vehicle mobile environment, compared to other relatively static use environments, attachment of optical films is required with more excellent reliability.

Figure 2:
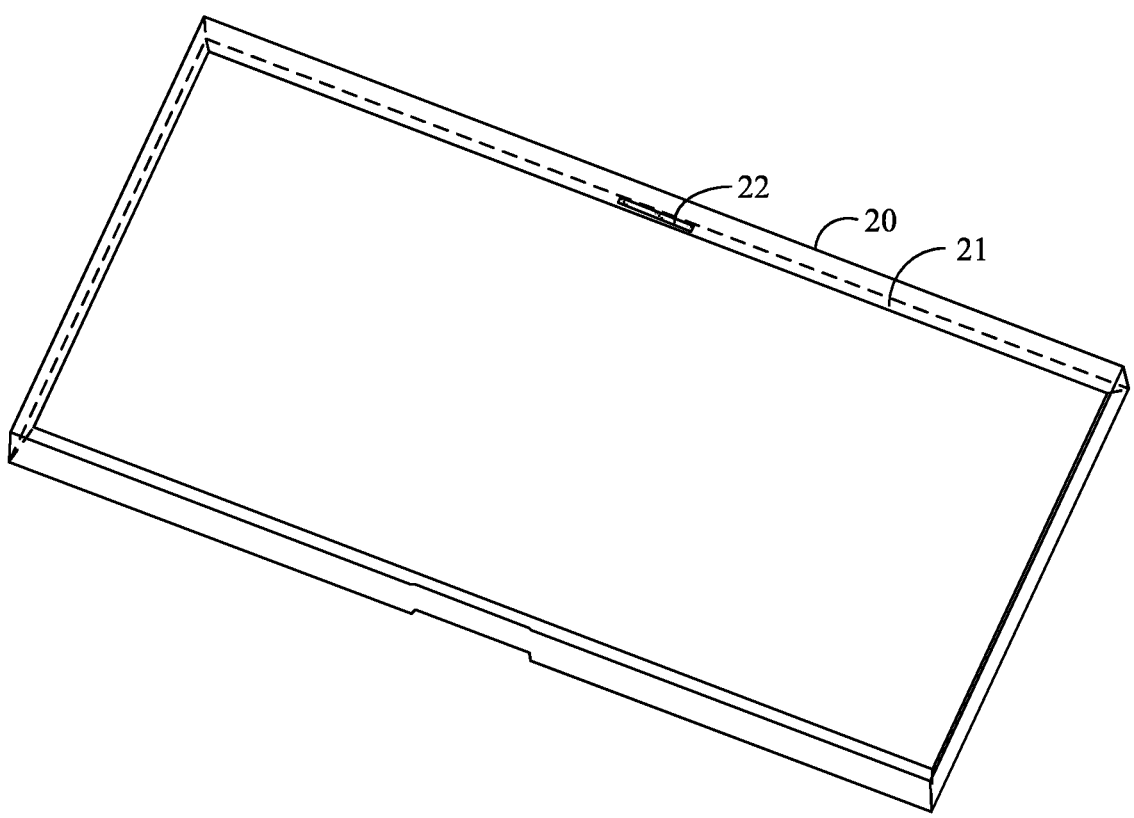
FIG. 2 is a schematic structural view of a frame of FIG. 1.
Figure 3:
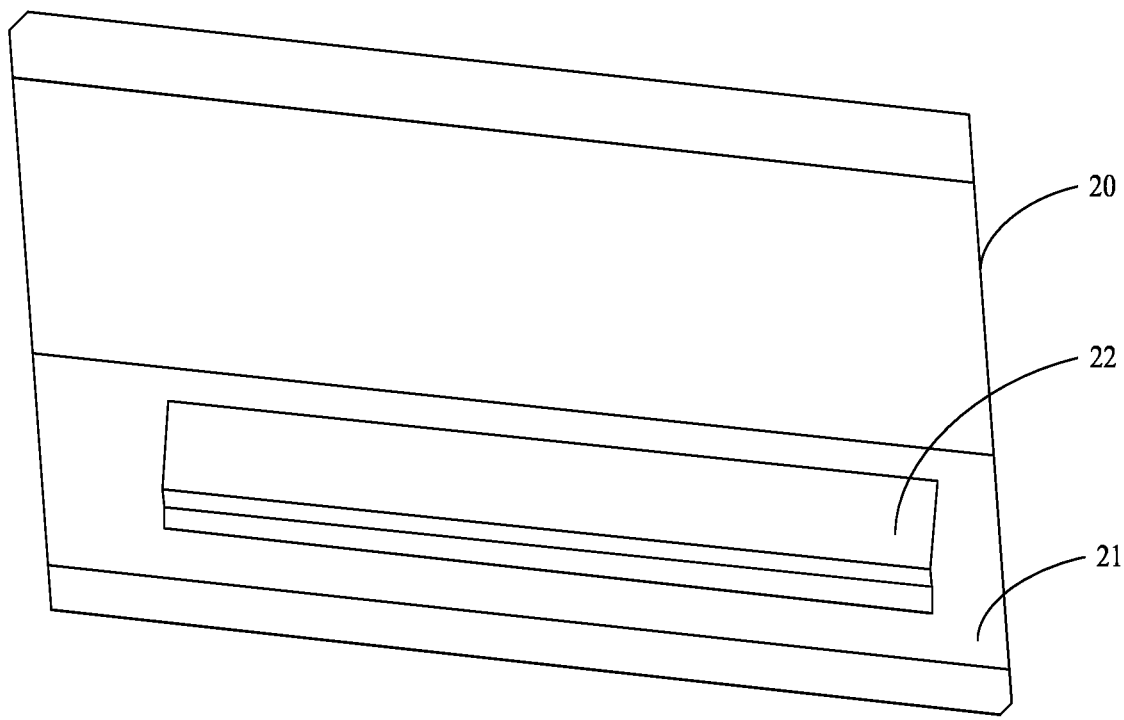
FIG. 3 is an enlarged schematic view of the frame and a protrusion of FIG. 2.

As shown in FIG. 2 or FIG. 3, in one embodiment, a protrusion 22 is disposed on the pressing surface 21 and may be integrally form with the frame 20, but not limited thereto. The protrusion 22 is adhesively attached to the light output surface of the first optical film 40 through the adhesive layer 30. It can be understood that the arrangement of the protrusion 22 facilitates adjustment of a thickness of the adhesive layer 30. The adhesive layer 30 has a thickness no less than at least a distance between the protrusion 22 and the first optical film 40, or provided for an interference fit, so as to maintain a plane angle of the first optical film 40 with respect to a space. It can be understood that the protrusion 22 at least overlaps part of the pressing surface 21. That is, the protrusion 22 has a certain area and takes up only a portion of the pressing surface 21. A size of the portion depends on attachment reliability required for the first optical film 40 and a reflection area as less as possible, thereby reducing or mitigating problems of bright edges and a fluorescence phenomenon in the backlight module caused by the reflection area.

It can be understood that the pressing surface 21 is provided on two opposite sides of the frame in a lengthwise direction and on two opposite sides the frame in a width direction. Regardless of whether the protrusion 22 is located on the pressing surface 21 in the length direction or the width direction, a technical purpose expected in this application can be achieved. Preferably, when the protrusion 22 is located on a middle area of the pressing surface 21 in the lengthwise direction and is far away from the light bar 60, better expected technical effects can be achieved.

It should be noted that the adhesive layer 30 is adhesively attached to a central area of the first optical film 40 in a lengthwise direction or a width direction, so as to maintain a good balance, such that the adhesive layer 30 located at or near an edge of the first optical film 40 can produce as little light reflection as possible. Furthermore, if the protrusion 22 is added to reduce a thickness of the adhesive layer 30 in some of the embodiments, a position of the protrusion 22 should take account of a bonding position of the adhesive layer 30 on the first optical film 40, so as to design a position of the corresponding protrusion 22.

In one embodiment, the protrusion 22 is rectangular in shape. The protrusion 22 has a length between 20 millimeters (mm) and 30 mm, a width between 2 mm and 3 mm, and a height between 0.1 mm and 0.5 mm. Preferably, the height of the protrusion 22 is 0.2 mm or 0.3 mm.

In one embodiment, an interference fit is provided between the adhesive layer 30 and the first optical film 40. It can be understood that an interference may be a pressing depth of the adhesive layer 30 when the adhesive layer 30 is bonded to the first optical film 40, so as to ensure an allowable deformation range of the adhesive layer 30 and mutual bonding strength between the adhesive layer 30 and the first optical film 40. Preferably, in the preset application, the interference fit is provided with an interference range of 0.08 mm to 0.12 mm. As a better choice, the interference in this application will be 0.1 mm.

It should be noted that the interference in this embodiment refers to a difference between a first thickness and a second thickness of the adhesive layer 30 in an original state (uncompressed), wherein, the second thickness is a thickness after the adhesive layer 30 is attached between the first optical film 40 and the protrusion 22/the pressing surface 21, and is compressed or squeezed.

Figure 4:
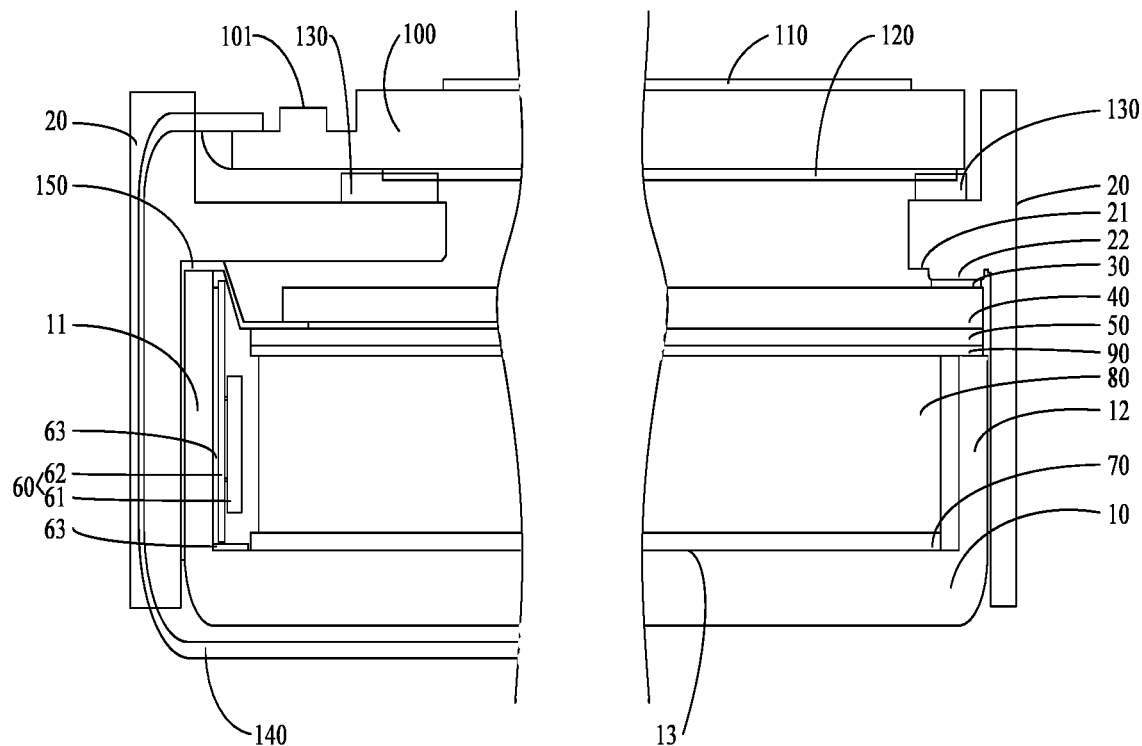
FIG. 4 is a schematic structural view of a liquid crystal display device provided by an embodiment of the present application.

As shown in FIGS. 1 and 4, in one embodiment, the backlight module further includes a second optical film 50 and a light-shielding elastic fixing member 150. The second optical film 50 has a light incident surface and a light output surface, the light incident surface of the second optical film is disposed away from the light incident surface of the first optical film 40, and the light output surface of the second optical film 50 is disposed facing the light incident surface of the first optical film 40. Specifically, both a side surface of the first optical film 40 and a side surface of the second optical film 50 located with respect to a side of second block wall 12 may be, but not limited to, flush with each other. That is, a distance between the first optical film 40 and the second block wall 12 is equal to a distance between the second optical film 50 and the second block wall 12 and overlaps part of the second block wall 12. In addition, a distance between the first optical film 40 and the first block wall 11 is greater than a distance between the second optical film 50 and the first block wall 11. Specifically, one end of the light-shielding elastic fixing member 150 is connected to an upper end surface and all or part of an outer surface of the first block wall 11, and another end is connected to the light output surface of the second optical film 50. Furthermore, the light-shielding elastic fixing member 150 is located between the light incident surface of the first optical film 40 and the light output surface of the second optical film 50, wherein at least part of the light-shielding elastic fixing member 150 overlaps the light bar 60.

It can be understood that the light-shielding elastic fixing member 150 does not affect degree of freedom of the first optical film 40 in terms of thermal expansion and contraction. A contact area between the light-shielding elastic fixing member 150 and the light incident surface of the first optical film 40 is flat and smooth, and they can only be in contact with each other without connecting. The light-shielding elastic fixing member 150 can be connected by opening a hole on the second optical film 50, or can also be realized by using a black single-sided tape. For example, one end of the single-sided tap adheres to the light output surface of the second optical film 50, another end adheres to an upper end surface and all or part of an outer surface of the first block wall 11. Specifically, one end of the single-sided tape is parallel to the light output surface of the second optical film 50 and extends beyond an area where the light output surface of the second optical film 50 is located, and then is obliquely disposed on the upper end surface of the first block wall 11 and is adhesively attached to the upper end surface and all or part of the outer surface of the first block wall 11. It can be understood that in this manner, when the second optical film 50 undergoes thermal expansion and contraction, the single-sided tape will not hinder its expansion and contraction within a certain range. In addition, the single-sided tape in black can shield light source of the laterally disposed light bar 60 before light guiding, so as to avoid unwanted reflected light, thereby eliminating or mitigating problems of bright edges and a fluorescence phenomenon in the backlight module.

Specifically, the single-sided tape may have a length between 20 mm and 30 mm, but not limited thereto. For example, the length may preferably be 25 mm. The single-sided tape may have a width between 5 mm and 10 mm. For example, the width can be preferably set to 2.5 mm.

In one embodiment, the backlight module may further be provided with a reflective sheet 70, a light guide plate 80, and a third optical film 90 in a direction in which the support surface 13 faces the first optical film 40. The light guide plate 80 is opposed to the light bar 60 to guide the light emitted by the light bar 60 so as to emit more uniform light from the light guide plate 80. The reflective sheet 70 can re-reflect the light emitted from a bottom of the light guide plate 80 to the light guide plate 80, which can improve the efficiency of light use. The third optical film 90 is located between the light guide plate 80 and the second optical film 50 and overlaps the second optical film 50. Regarding a spacing distance of the first block wall 11, a distance from the reflective sheet 70 to the first block wall 11 is less than a distance from the light guide plate 80 to the first block wall 11. A distance from the reflective sheet 70 to the first block wall 11 is greater than a distance from the third optical film 90 to the first block wall 11. A distance from the second block wall 12 to the reflective sheet 70 and/or the light guide plate 80 may be, but not limited to, the same, or a distance greater than zero. A part of the third optical film 90 is located above the second block wall 12 and does not completely cover the second block wall 12. It can be understood that, on a side close to the second block wall 12, distances from the first optical film 40, the second optical film 50, and the third optical film 90 to the frame 20 can be, but not limited to, the same.

It should be noted that the first optical film 40 is a polarizing light-enhancing film, which is mainly composed of polycarbonate. Polycarbonate is a tough thermoplastic resin. As internal temperature of the backlight module increases, the first optical film 40 mainly expands and extends toward the first block wall 11, and its expansion coefficient is approximately $75 \times 10^{-6}/°C$. The second optical film 50 is a light-enhancing film, mainly composed of polyester resin, which is the most important variety in thermoplastic polyester, and an expansion coefficient of the second optical film 50 is about 35×10–6/° C. As the internal temperature of the backlight module increases, the second optical film 50 mainly expands toward the second block wall 12. The third optical film 90 is a diffusion film. In this manner, heat changes of the first optical film 40 and the second optical film 50 are concentrated on one side of the light bar 60, and there is no need to reserve too much room for expansion and contraction on a side of the frame opposite to the light bar 60, thereby facilitating fulfillment of reliable attachment of corresponding optical films and narrow bezel design of in-vehicle backlight modules.

In one embodiment, the light bar 60 may include, but is not limited to, a flexible circuit board 140 and a light-emitting diode (LED) lamp 61 electrically connected to the flexible circuit substrate 62. The LED lamp 61 is located on one side of the flexible circuit board 62, and a thermally conductive glue 63 is bonded to the other side of the flexible circuit board 62 and fixed on an inner side of the first block wall 11. In addition, the thermally conductive glue 63 is still provided between the other side of the flexible circuit substrate 62 and the support surface 13 to accelerate heat dissipation of the light bar 60 to a bottom plate.

As shown in FIG. 4, in one embodiment, the present application provides a liquid crystal display device, including the backlight module and a liquid crystal display screen 100 in accordance with any one of the above-mentioned embodiments. The liquid crystal display screen 100 is assembled or fixed to a rear or a reverse surface of the pressing surface 21 of the frame 20 through a transparent adhesive 130. It can be understood that the liquid crystal display screen 100 includes a driving integrated circuit (IC) 101.

The liquid crystal display device further includes a flexible circuit board 140, which is connected to the driving IC 101 on the liquid crystal display screen 100 by an adhesive or by hot pressing. The flexible circuit board 140 is wound to a side of the backplate 10 through a groove provided on the frame 20, and accesses external signals. Outer surfaces of the first block wall 11 and/or the second block wall 12 of the backplate 10 in contact with the bottom of the backplate 10 are arc in shape or circular arc in shape.

In one embodiment, the liquid crystal display device may further include an upper polarizer 110 and a lower polarizer 120 disposed on both sides of the liquid crystal display screen 100. The lower polarizer 120 is located between the transparent glue 130 and the liquid crystal screen 100, and is bonded with part of the transparent adhesive 130.

It can be understood that, in a Z-axis direction of the backlight module and liquid crystal display device provided in the present application, the first optical film 40 is attached and fixed on the frame 20 or the protrusion 22 by a double-sided tape, which can prevent the first optical film 40 from being displaced during vibration. At the same time, the optical film corresponding to the backlight module can expand and contract freely above a side of the light bar 60 to prevent the optical film from failing to expand and contract during high and low temperature cycles, causing wrinkles and affecting the optical effect. The second optical film 50 is fixed with black single-sided tape on the side of the light bar 60, and is simultaneously reversely attached to the upper end surface and part or all of the side surfaces of the first block wall 11, so that the black single-sided tape can function to block the light source and prevent occurrence of bright spots, thereby not only ensuring high reliability of the in-vehicle backlight module, but also addressing problems that conventional narrow-bezel type backlight modules fail to reserve room for expansion for corresponding optical films in a lengthwise direction and have bright spots occurred on narrow frames due to a relatively limited space of narrow frames.

It should be noted that the backlight module and the liquid crystal display device provided in the present application can be, but are not limited to, applied to a field of vehicle display technology and/or narrow frame display technology, and can also be applied to a field of polysilicon liquid crystal display technology, especially low temperature poly-silicon (LTPS) liquid crystal display technology field.

It can be understood that, for those of ordinary skill in the art, equivalent replacements or changes can be made according to the technical solution of the present application and its inventive concept, and all these changes or replacements shall fall within the protection scope of the appended claims of the present application.

What is claimed is:

1. A backlight module, comprising:
   a backplate comprising a first block wall and a second block wall disposed opposite to the first block wall;
   a light bar disposed on an inner side of the first block wall;
   a first optical film having a light incident surface and a light output surface, and the light incident surface facing a support surface disposed on the backplate; and
   a frame comprising a pressing surface facing the light output surface of the first optical film;
   wherein the pressing surface of the frame provided adjacent to a side of the second block wall is adhesively attached to the light output surface of the first optical film through an adhesive layer, and
   an interference fit is provided between the adhesive layer and the first optical film.

2. The backlight module of claim 1, wherein a protrusion is disposed on the pressing surface and is adhesively attached to the light output surface of the first optical film through the adhesive layer, and the protrusion is structured to cover part of the pressing surface.

3. The backlight module of claim 2, wherein the protrusion is disposed in a longitudinal direction on the pressing surface and is located at a middle portion of the pressing surface.

4. The backlight module of claim 1, wherein the interference fit is provided with an interference range of 0.08 millimeters (mm) to 0.12 mm.

5. The backlight module of claim 2, wherein the protrusion is rectangular in shape, and has a length between 20 mm and 30 mm, a width between 2 mm and 3 mm, and a height between 0.1 mm and 0.5 mm.

6. The backlight module of claim 2, wherein the adhesive layer has a thickness the same as a distance between the protrusion and the first optical film.

7. A backlight module, comprising:
   a backplate comprising a first block wall and a second block wall disposed opposite to the first block wall;
   a light bar disposed on an inner side of the first block wall;
   a first optical film having a light incident surface and a light output surface, and the light incident surface facing a support surface disposed on the backplate;
   a frame comprising a pressing surface facing the light output surface of the first optical film; and
   a second optical film and a light-shielding elastic fixing member;
   wherein the pressing surface of the frame provided adjacent to a side of the second block wall is adhesively attached to the light output surface of the first optical film through an adhesive layer;

wherein the second optical film has a light incident surface and a light output surface, the light incident surface of the second optical film is disposed away from the light incident surface of the first optical film, and the light output surface of the second optical film is disposed facing the light incident surface of the first optical film; and wherein one end of the light-shielding elastic fixing member is connected to the first block wall, and another end of the light-shielding elastic fixing member is connected to the light output surface of the second optical film, and the light-shielding elastic fixing member is located between the light incident surface of the first optical film and the light output surface of the second optical film.

8. The backlight module of claim 7, wherein the light-shielding elastic fixing member is a black single-sided tape.

9. The backlight module of claim 8, wherein the single-sided tape has a length between 20 mm and 30 mm and a width between 5 mm and 10 mm.

10. The backlight module of claim 1, wherein the second block wall overlaps part of the first optical film.

11. The backlight module of claim 7, wherein a distance between the first optical film and the first block wall is greater than a distance between the second optical film and the first block wall.

12. The backlight module of claim 11, wherein a distance between the first optical film and the second block wall is equal to a distance between the second optical film and the second block wall.

13. A backlight module, comprising:
a backplate comprising a first block wall and a second block wall disposed opposite to the first block wall;
a light bar disposed on an inner side of the first block wall;
a first optical film having a light incident surface and a light output surface, and the light incident surface facing a support surface disposed on the backplate; and
a frame comprising a pressing surface facing the light output surface of the first optical film;
wherein the pressing surface of the frame provided adjacent to a side of the second block wall is adhesively attached to the light output surface of the first optical film through an adhesive layer, and
wherein the adhesive layer is a double-sided tape.

14. A liquid crystal display device, comprising: the backlight module of claim 1 and a liquid crystal display screen disposed on a surface of the frame opposite to the pressing surface.

15. The liquid crystal display device of claim 14, further comprising a flexible circuit board assembled with the liquid crystal display screen.

16. The liquid crystal display device of claim 15, wherein a protrusion is disposed on the pressing surface and is adhesively attached to the light output surface of the first optical film through the adhesive layer, and the protrusion is structured to cover part of the pressing surface.

17. The liquid crystal display device of claim 16, wherein the protrusion is disposed in a longitudinal direction on the pressing surface and is located at a middle portion of the pressing surface.

18. The liquid crystal display device of claim 14, wherein the interference fit is provided with an interference range of 0.08 millimeters (mm) to 0.12 mm.

* * * * *